United States Patent
Morin et al.

(10) Patent No.: US 11,379,908 B2
(45) Date of Patent: Jul. 5, 2022

(54) THREE-DIMENSIONAL RECONSTRUCTION OF A PRODUCT FROM CONTENT INCLUDING THE PRODUCT PROVIDED TO AN ONLINE SYSTEM BY USERS

(71) Applicant: Meta Platforms, Inc., Menlo Park, CA (US)

(72) Inventors: Steve Morin, San Francisco, CA (US); Anuj Madan, San Mateo, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/871,770

(22) Filed: May 11, 2020

(65) Prior Publication Data
US 2021/0350451 A1  Nov. 11, 2021

(51) Int. Cl.
G06Q 30/00 (2012.01)
G06Q 30/06 (2012.01)
G06Q 30/02 (2012.01)

(52) U.S. Cl.
CPC ..... *G06Q 30/0643* (2013.01); *G06Q 30/0207* (2013.01); *G06Q 30/0625* (2013.01)

(58) Field of Classification Search
None
See application file for complete search history.

(56) References Cited

U.S. PATENT DOCUMENTS

| | | | |
|---|---|---|---|
| 9,767,505 B1 | 9/2017 | Shi | |
| 10,706,452 B1 * | 7/2020 | Ghamsari | G06N 20/00 |
| 2006/0277145 A1 | 12/2006 | Raccah et al. | |
| 2011/0119117 A1 * | 5/2011 | Yu | G06Q 30/0601 705/12 |
| 2016/0110794 A1 | 4/2016 | Hsiao et al. | |
| 2016/0210602 A1 * | 7/2016 | Siddique | G06Q 20/204 |
| 2016/0371546 A1 * | 12/2016 | Yadav | G11B 27/34 |
| 2017/0076345 A1 * | 3/2017 | Pan | H04L 67/22 |
| 2018/0302682 A1 | 10/2018 | Saxena et al. | |
| 2018/0341907 A1 * | 11/2018 | Tucker | G06Q 30/0623 |

(Continued)

FOREIGN PATENT DOCUMENTS

WO  WO-2016191685 A1 * 12/2016 ............. A63F 13/63

OTHER PUBLICATIONS

Zheng Qin, "Introduction to E-commerce", 2009, Springer, springer.com (Year: 2009).*

(Continued)

*Primary Examiner* — Naeem U Haq
*Assistant Examiner* — Norman Donald Sutch, Jr.
(74) *Attorney, Agent, or Firm* — Fenwick & West LLP

(57) ABSTRACT

A publishing user identifies a product offered by the user to an online system by providing multiple images of a product viewed at different angles to the online system. The online system applies an identification model to content items obtained from other users to identify the product. From images of the product from the publishing user and content items from other users having at least a threshold confidence of including the product, the online system generates a three-dimensional reconstruction of the product. The online system may subsequently use the three-dimensional reconstruction of the product to display the product to users or to allow other users to identify the product from the online system.

10 Claims, 3 Drawing Sheets

(56) References Cited

U.S. PATENT DOCUMENTS

2019/0378204 A1    12/2019  Ayush et al.
2021/0082037 A1*    3/2021  Oh ..................... G06Q 30/0643

OTHER PUBLICATIONS

Geoffery Poon et al; "Enabling 3D Online Shopping with Affordable Depth Scanned Models"; 2014; Department of Computer Science Caritas Institute of Higher Education, Hong Kong (Year: 2014).*
European Search Report for European Application No. 21172600.5, dated Oct. 6, 2021, 2 pages.
Goel N., "Shopbot: An Image Based Search Application for E-Commerce Domain," Master's Projects, 2017, 70 Pages, https://scholarworks.sjsu.edu/etd_projects/516/.
Non-Final Office Action dated Oct. 27, 2021 for U.S. Appl. No. 16/917,866, filed Jun. 30, 2020, 11 pages.

* cited by examiner

THREE-DIMENSIONAL RECONSTRUCTION OF A PRODUCT FROM CONTENT INCLUDING THE PRODUCT PROVIDED TO AN ONLINE SYSTEM BY USERS

BACKGROUND

This disclosure relates generally to display of content by an online system, and more specifically to the online system generating a reconstruction of a product identified to the online from content obtained by online system obtains from users for presentation.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users.

Additionally, many publishing users of an online system offer products for purchase by other users and distribute content items including the offered products to other users via the online system. For example, a publishing user offers home goods for purchase by other user and distributes content items including images of the home goods to other users to increase awareness of the home goods. To allow online system users to more readily purchase products offered by the purchasing user, the publishing user may provide a product page to the online system identifying multiple products offered for purchase by the publishing user. The product page includes one or more images of various products offered by the publishing user, as well as information about different products offered by the publishing user. Additionally, the product page may include one or more options for a viewing user to select and to purchase products offered by the publishing user via the product page. For various products, including a three-dimensional representation of the product on the product page may increase user interest in those products, encouraging users to purchase those products. While a three-dimensional rendering or representation of a product is desirable, generating such a three-dimensional rendering of a product require significant financial resources, as well as resources to capture images of products from multiple angles to generates the three-dimensional rendering, which may prevent many publishing users from including three-dimensional renderings of products on a product page presented by the online system.

SUMMARY

An online system obtains information from a publishing user identifying products that a user of the online system offers for purchase by other users. The obtained information includes one or more pictures of each product associated with a product identifier and may also include additional information about each product. For example, the online system obtains a product catalog from the publishing user that includes entries for each product offered by the publishing user. In some embodiments, an entry in the product catalog for a product includes a product identifier of the product, one or more pictures of the product, a name of the product, and a price at which the publishing user offers the product for purchase. An entry in the product catalog for a product may also include a description of the product in some embodiments. Information identifying a product obtained from the publishing user includes multiple pictures of the product in some embodiments, with different pictures corresponding to different positions of the product relative to an image capture device (e.g., a camera) that captured the pictures of the product. The online system stores the information identifying the products offered by the publishing user, which includes one or more pictures of each of the products in association with the publishing user. For example, the online system stores information identifying the products offered by the publishing user in a user profile maintained by the online system for the publishing user or stores the obtained information identifying products offered by the publishing user in association with a user profile identifying the publishing user.

Additionally, the online system obtains content items from various users other than the publishing user for presentation to other users. A content item obtained from a user includes an image or a video, and may also include text data or audio data. In various embodiments, a content item includes any combination of text data, audio data, image data, video data for presentation to other users via the online system. The online system leverages content items obtained from various users and pictures of a product obtained from a publishing user to generate a three-dimensional representation of the product. To leverage content items obtained from users, the online system identifies objects included in content items including video or an image. In various embodiments, the online system compares an object (or each object) identified from an image or from a video in a content item obtained from a user other than the publishing user to images of the product obtained from the publishing user. For example, the online system compares one or more objects identified from a content item received from a user other than the publishing user to pictures of the product from different angles that were obtained from the publishing user. When comparing an object identified from a content item obtained from a user other than the publishing user to previously obtained images of a product offered by the publishing user, the online system determines confidences of the identified object matching the product offered by the publishing user. To compare the object identified from the content item to the product offered by the publishing user, the online system applies an identification model to the identified object and to the images obtained from the publishing user of the product offered by the publishing user. The online system trains the machine learning identification model from comparisons of objects identified from images or video included in content items to products identified to the online system by various users, and may also account for comparisons of objects to publicly available information identifying different products when training the identification model. The online system trains the identification model to determine a likelihood of an object identified from a content item matching a product based on prior matching of objects identified from content items to different products. For example, the online system applies a label indicating a product matching an object identified from the content item to characteristics of the object identified from the content item. From the labeled characteristics of objects extracted from content items, the online system trains the identification model using any suitable training method or combination of training methods (e.g., back propagation to train the identification model if it is a neural network, curve fitting techniques if the identification model is a linear regression). After training, the online system applies the trained identification model to characteristics of objects identified from a content item (e.g., from an image or a video included in a content item), and the identification model outputs a confidence of the object identified from the content item matching a product.

Responsive to the confidence of the object identified from the content item obtained by a user other than the publishing user having at least a threshold value, the online system determines the content item includes the product. The online system stores an image or a video included in the content item determined to include the product in association with the product. In various embodiments, the online system augments an entry in the product catalog received from the publishing user that corresponds to the product with the content item determined to include the product (or with an image or a video from the content item determined to include the product). Alternatively, the online system stores information identifying the content item determined to include the product (e.g., identifiers of each content item determined to include the product) in the entry in the product catalog received from the publishing user corresponding to the product. From one or more content items obtained from users other than the publishing user that the online system determined to include the product and pictures of the product from different angles obtained from the publishing user, the online system generates a three-dimensional reconstruction of the product. The online system applies one or more three-dimensional reconstruction processes to the pictures of the product from different angles obtained from the publishing user and the content items from users other than the publishing user determined to include the product. Example three-dimensional reconstruction methods include Generative adversarial networks (GANs), projective reconstruction, affine reconstruction, Euclidean reconstruction, or any other suitable rendering method based on multiple images of the product.

The online system stores the three-dimensional reconstruction of the product in association with the product. For example, the online system stores the three-dimensional reconstruction of the product in the entry in the product catalog received from the publishing user that corresponds to the product. The online system also allows other users to view the three-dimensional reconstruction of the product. For example, the online system includes a link to the three-dimensional reconstruction or includes the three-dimensional reconstruction in a product page for the viewing user that identifies different products offered by the publishing user. As another example, the online system may overlay the three-dimensional rendering of the product onto a video of a user, allowing the user to better visualize the product relative to the user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
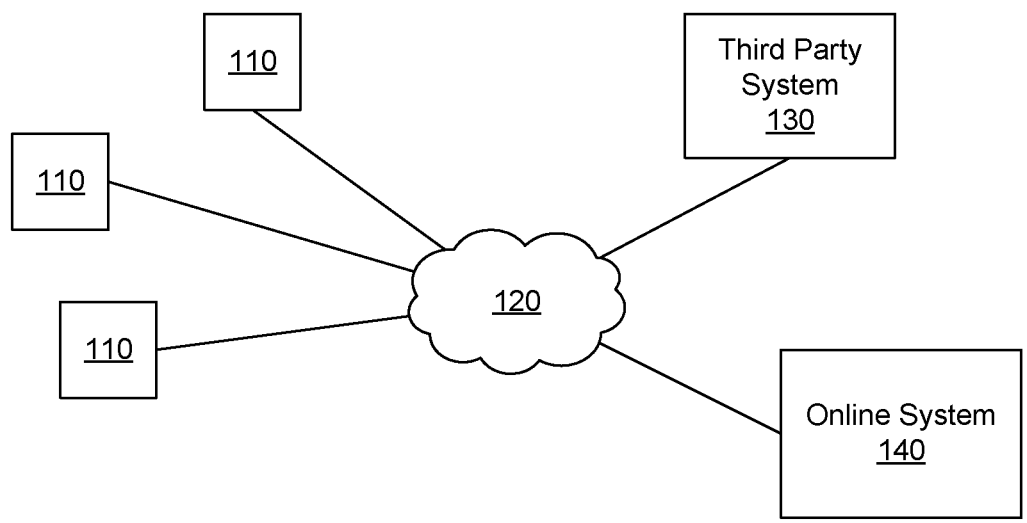
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
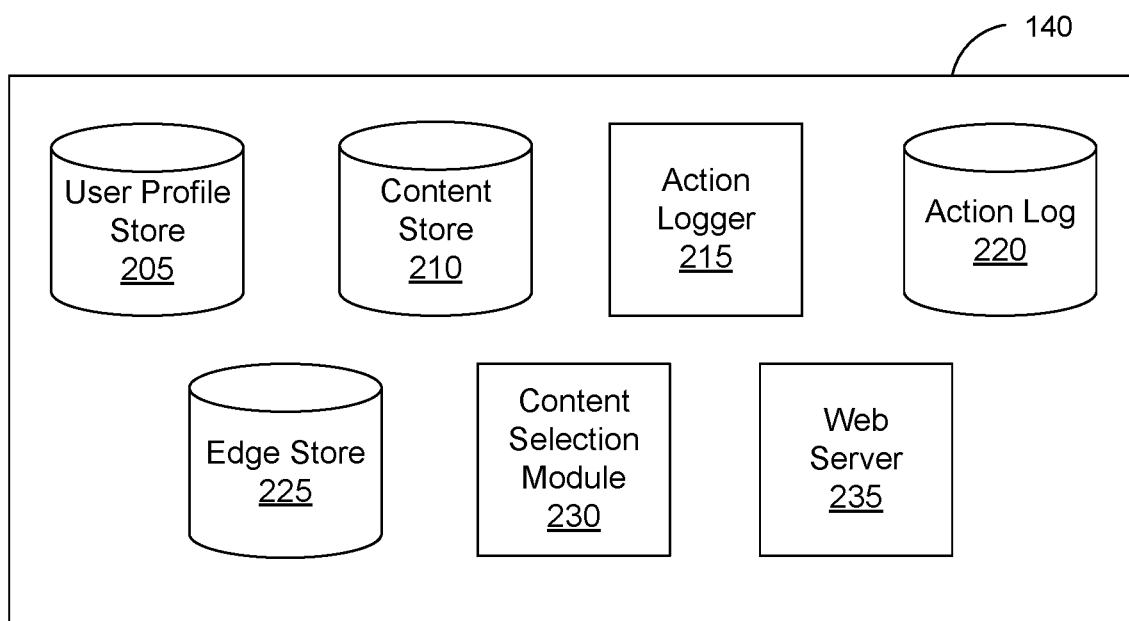
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

In various embodiments, the online system 140 receives information from a user identifying various products that the user offers for purchase. The obtained information includes one or more pictures of each product associated with a product identifier and may also include additional information about each product. For example, the online system 140 obtains a product catalog from a user that includes entries for each product offered by the user. In some embodiments, an entry in the product catalog for a product includes a product identifier of the product, one or more pictures of the product, a name of the product, and a price at which the user offers the product for purchase. An entry in the product catalog for a product may also include a description of the product in some embodiments. Information identifying a product obtained from a user includes multiple pictures of the product in some embodiments, with different pictures corresponding to different positions of the product relative to an image capture device (e.g., a camera) that captured the pictures of the product. The online system 140 stores the information identifying the products offered by the user, which includes one or more pictures of each of the products in association with the user in a user profile for the user in the user profile store 205 in various embodiments. Alternatively, the online system 140 stores the obtained information describing products offered by the user in the content store 210 along with an association between the user profile of the user and the obtained information.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 are "sponsored content items" that include content for presentation to a user and for which the online system 140 receives compensation from a user from whom the online system 140 obtained the sponsored content item in exchange for presenting the content item to another user, which may be contingent on whether the other user performs a specific action after the content from the sponsored content item is displayed to the other user. In various embodiments, the content also specifies a page of content. For example, a sponsored content item includes a landing page specifying a network address of a page of content to which a user is directed when the content item is accessed. In various embodiments, a bid amount of a sponsored content item specifies an amount of compensation the online system 140 receives in exchange for displaying the sponsored content item to users. The bid amount may be used to determine an expected value, such as monetary compensation, provided by the user to the online system 140 if content in the sponsored content item is presented to a viewing user, if the content in the sponsored content item receives an interaction from the viewing user when presented, or if any suitable condition is satisfied when content in the sponsored content item is presented to a user. For example, the bid amount of a sponsored content item specifies a monetary amount that the online system 140 receives from a user who provided the sponsored content item to the online system 140 if content in the sponsored content item is displayed. In some embodiments, the expected value to the online system 140 of presenting the content from the sponsored content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items, such as sponsored content items, may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. One or more objectives may identify a specific interaction with a landing page to which a content item, such as a sponsored content item, includes a link. Example specific interactions with the landing page include: establishing a connection to the landing page via the online system 140, transmitting a message to the publishing user through the online system via a link included on the landing page, indicating a preference for one or more content items included on the landing page, selecting a link to a website in a different domain than the online system 140 included on the landing page, selecting a link on the landing page to establish a telephone call to the publishing user, purchasing one or more products via the landing page, selecting a link on the landing page to obtain directions to a physical location associated with the publishing user, selecting a link on the landing page to transmit an electronic mail message to the publishing user, and any combination thereof. Additionally, the online system 140 receives compensation from a user associated with content item as online system users perform interactions with a content item that satisfy the objective included in the content item.

Additionally, a content item, such as a sponsored content item, may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In various embodiments, the content store 210 includes multiple campaigns, which each include one or more content items. In various embodiments, a campaign in associated with one or more characteristics that are attributed to each content item of the campaign. For example, a bid amount associated with a campaign is associated with each content item of the campaign. Similarly, an objective associated with a campaign is associated with each content item of the campaign. In various embodiments, a user providing content items to the online system 140 provides the online system 140 with various campaigns each including content items having different characteristics (e.g., associated with different content, including different types of content for presentation), and the campaigns are stored in the content store.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

Additionally, in various embodiments, the content store 210 includes one or more content reels, with each content reel including one or more content items. A content reel includes one or more content items and an order in which the content items are displayed when the content reel is displayed. A user selects content items for inclusion in a content reel, and the content store 210 stores an identifier of content reel in association with an identifier of the user and with identifiers of content items included in the content reel, and the order in which the content items are to be displayed. In various embodiments, content items are included in a content reel for a specific amount of time, and a content item is removed from the content reel after the specific amount of time from the inclusion of the content item in the content reel. For example, the online system 140 removes an association between an identifier of a content item and an identifier of a content reel 24 hours after a time when the content item was included in the content reel by a user associated with the content reel.

The action logger 215 receives communications about user actions (or "interactions") internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a reaction to an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. In some embodiments, when determining a measure of relevance of a content item to a user, the content selection module 230 determines a likelihood of the user performing a specific interaction with a page of content to which the content item includes a link after being presented with the content item (e.g., within a threshold amount of time of the content item being presented to the user); in various embodiments, the specific interaction is associated with the content item by a publishing user from whom the online system 140 obtained the content item. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with content items when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. In various embodiments, the expected value associated with a content item is a product of a bid amount included in the content item and a likelihood of the user performing a specific interaction with a landing page to which the content item includes a link after the content item is displayed to the user. The specific interaction with the landing page is specified by a publishing user from whom the online system 140 obtained the content item in various embodiments. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

In various embodiments, the content selection module 230 trains and stores one or more machine learning models that identify objects within an image, or within video, included in a content item and that determine confidences of an identified object matching a product offered by a user from whom the content item was obtained. In various embodiments, the content selection model 230 maintains one or more machine learned models trained to identify objects within an image or video and maintains a separate machine learned identification model that compares an object identified within an image or within video to pictures of products offered bur purchase by a user from whom the image or the video was obtained. As further described below in conjunction with FIG. 3, the identification model determines confidences of an object identified within an image or within video matching different products offered by the user based on characteristics of the identified object and characteristics of pictures of different products offered by the user.

From pictures of a product obtained by a publishing user offering the product and content items obtained from other users different than the viewing user, the content selection module 230 uses one or more three-dimensional reconstruction processes to generate a three-dimensional reconstruction of the product. As further described below in conjunction with FIG. 3, the content selection module 230 stores the three-dimensional reconstruction in association with the product and subsequently displays the three-dimensional reconstruction to other users. For example, the content selection module 230 displays the three-dimensional reconstruction to users in conjunction with other information about the product. As another example, the content selection module 230 generates an image or a video including the three-dimensional reconstruction and a user and displays the generated image or video to the user, as further described below in conjunction with FIG. 3.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
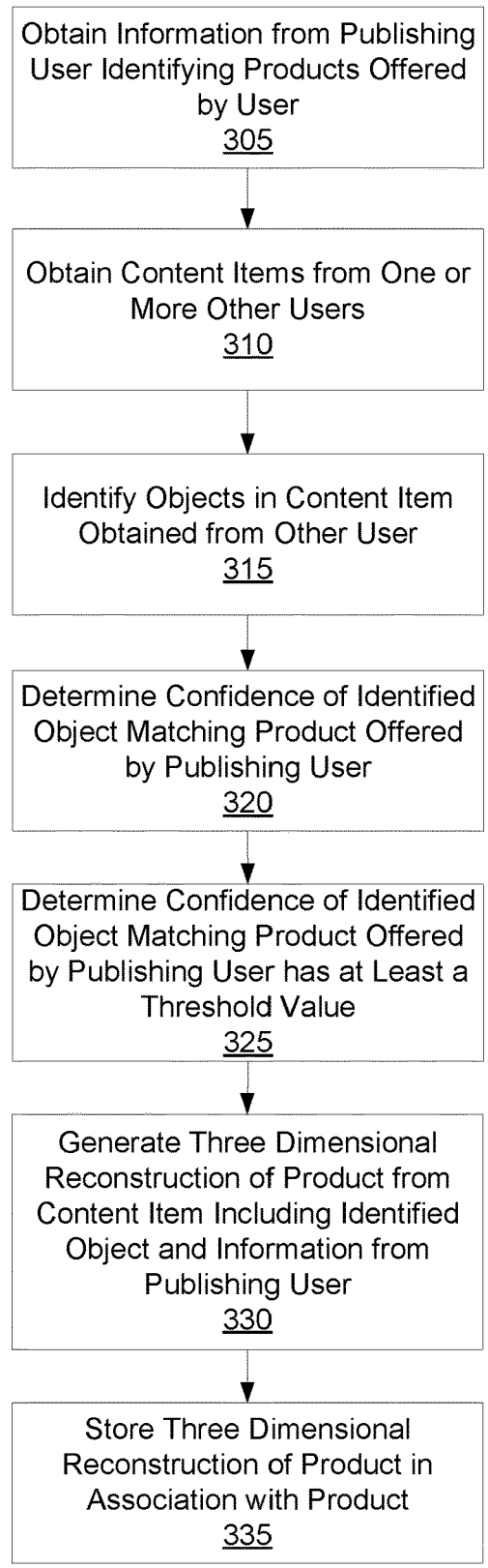
FIG. 3 is a flowchart of a method for an online system generating a three-dimensional representation of a product offered by a publishing user based on content items including the product obtained from other users, in accordance with an embodiment.

Generation of a Three-Dimensional Representation of a Product from Content Items Including the Product FIG. 3 is a flowchart of one embodiment of a method for an online system 140 generating a three-dimensional representation of a product offered by a publishing user based on content items including the product obtained from other users. For purposes of illustration, FIG. 3 describes the method in conjunction with identification of products offered by a user within an image obtained by the user, but the method described in conjunction with FIG. 3 may also be used to identify products offered by a user within a video obtained from the user (e.g., the method may be applied to frames of the video obtained from the user as described below in conjunction with FIG. 3 with regard to an image obtained from the user). In various embodiments, the method may include different or additional steps than those described in conjunction with FIG. 3. Additionally, in some embodiments, the method may perform the steps in different orders than the order described in conjunction with FIG. 3.

An online system 140, as further described above in conjunction with FIG. 2, obtains 305 information from a publishing user identifying products that the publishing user of the online system 140 offers for purchase by other users. The obtained information includes one or more images of each product associated with a product identifier, and may also include additional information about each product. The obtained information may also include one or more videos of each product associated with a product identifier. For example, the online system 140 obtains 305 a product catalog from the publishing user that includes entries for each product offered by the user. In some embodiments, an entry in the product catalog for a product includes a product identifier of the product, one or more images of the product, a name of the product, and a price at which the user offers the product for purchase. An entry in the product catalog for a product may also include a description of the product in some embodiments. Information identifying a product obtained 305 from the publishing user includes multiple images of the product, with different images corresponding to different positions of the product relative to an image capture device (e.g., a camera) that captured the images of the product; hence, different images of the product correspond to different angle at which the product is viewed. The online system 140 stores the information identifying the products offered by the publishing user, which includes one or more images of each of the products corresponding to different angles at which the products are viewed in association with the publishing user. For example, the online system 140 stores information identifying the products offered by the publishing user in a user profile maintained by the online system 140 for the publishing user or stores the obtained information identifying products offered by the publishing user in association with a user profile identifying the publishing user.

Additionally, the online system 140 obtains 310 content items from various users other than the publishing user for presentation to other users. A content item obtained 310 from a user includes an image or a video and may also include text data or audio data. In various embodiments, a content item includes any combination of text data, audio data, image data, and video data for presentation to other users via the online system 140. One or more content items obtained 310 from users other than the viewing user include an image or a video including a product offered by the publishing user. The online system 140 leverages content items including the product offered by the publishing user to augment information stored by the online system 140 identifying the product offered by the publishing user.

To leverage content items obtained from users other than the publishing user to augment information stored by the online system 140 identifying a product offered by the publishing user, the online system 140 identifies 315 objects from a content item obtained 310 from a user other than the publishing user. In various embodiments, the online system 140 applies one or more object detection methods to an image or to a video included in the content item from the user other than the publishing user that identify objects in the image or in the video within the content item. In some embodiments, the online system 140 also identifies locations within the image of identified objects. For example, the online system 140 generates a bounding box surrounding each object identified in the image within the content item. In various embodiments, the online system 140 uses one or more object detection methods to identify 315 objects within the content item to generate bounding boxes corresponding to each of the identified objects. When identifying 315 objects from the content item, the online system 140 may also identify a category or a type for each identified object. For example, an object detection method applied by the online system 140 associates different categories with objects based on characteristics of the objects, and the online system 140 associates a type or a category from the object detection method with an identified object.

The online system 140 compares various objects identified 315 from the content item obtained 310 from the user other than the publishing user to pictures of products included in the information identifying products offered by the publishing user that the online system 140 obtained 305 from the publishing user. In some embodiments, the online system 140 compares each object identified 315 from the content item obtained 310 from the user other than the publishing user to pictures of one or more products obtained 305 from the publishing user. When comparing an object identified 315 from the content item obtained 310 from the user other than the publishing user to previously obtained 305 images of products offered by the publishing user, the online system 140 determines 320 a confidence of the identified object matching a product offered by the publishing user. To compare the object identified 315 from the user other than the publishing user to the product offered by the publishing user, the online system 140 applies an identification model to the identified object and to the pictures obtained 305 from the publishing user the product offered by the publishing user. The online system 140 trains the machine learning identification model from comparisons of objects identified from images to products identified to the online system 140 by various users and may also account for comparisons of objects to publicly available information identifying different products when training the identification model. The online system 140 trains the identification model to determine a likelihood of an object identified from a content item (e.g., an image or a video included in the content item) matching a product based on prior matching of objects in content items to different products. For example, the online system 140 applies a label indicating a product matching an object identified from the content item to characteristics of the object identified from the content item. From the labeled characteristics of objects extracted from content items, the online system 140 trains the identification model using any suitable training method or combination of training methods (e.g., back propagation to train the identification model if it is a neural network, curve fitting techniques if the identification model is a linear regression). After training, the online system 140 applies the trained identification model to characteristics of objects identified within a content item, and the identification model outputs confidences of the object matching a product.

Responsive to online system 140 determining 325 the confidence of the object identified from the content item obtained 310 by the user other than the publishing user has at least a threshold value, the online system 140 determines the content item includes the product offered by the publishing user. The online system 140 stores an image or a video included in the content item obtained 310 from the user other than the publishing user determined to include the product in association with the product offered by the publishing user. In various embodiments, the online system 140 augments an entry in the product catalog received from the publishing user that corresponds to the product with the content item obtained 310 from the user other than the publishing user determined to include the product (or with an image or a video from the content item determined to include the product). Alternatively, the online system 140 stores information identifying the content item obtained 310 from the user other than the publishing user that was determined to include the product (e.g., identifiers of the content item obtained 310 from the user other than the publishing user determined to include the product) in the entry in the product catalog obtained 305 from the publishing user corresponding to the product.

From the pictures of the product corresponding to different angles with which the product was viewed obtained 305 from the publishing user and from one or more content items obtained 310 from users other than the publishing user that the online system 140 determined to include the product, the online system 140 generates 330 a three-dimensional reconstruction of the product. The online system 140 applies one or more three-dimensional reconstruction processes to the pictures of the product corresponding to different angles from which the product was viewed obtained 305 from the publishing user and the one or more content items obtained 310 from one or more users other than the publishing user that the online system 140 determined included the product. Example three-dimensional reconstruction methods include Generative adversarial networks (GANs), projective reconstruction, affine reconstruction, Euclidean reconstruction, or any other suitable rendering method based on multiple images of the product. However, in various embodiments, the online system 140 applies any suitable three-dimensional reconstruction process or combination of three-dimensional reconstruction processes to the pictures of the product obtained 305 from the publishing user and to one or more of the content items obtained 310 from users other than the publishing user determined by the online system 140 to include the product to generate 330 the three-dimensional reconstruction of the product.

The online system 140 stores 335 the three-dimensional reconstruction of the product offered by the publishing user in association with the product. For example, the online system 140 stores 335 the three-dimensional reconstruction of the product in the entry in the product catalog received from the publishing user that corresponds to the product. In other embodiments, the online system 140 stores 335 the three-dimensional reconstruction of the product separate from information obtained 305 from the publishing user, and stores an identifier or other information for accessing the three-dimensional reconstruction of the product (e.g., a link to the three-dimensional reconstruction of the product) in association with information obtained 305 from the publishing user identifying the product (e.g., in an entry in the product catalog obtained 305 form the publishing user corresponding to the product).

The online system 140 also allows other users to view the three-dimensional reconstruction of the product. For example, the online system 140 maintains a product page for the publishing user that displays information identifying different products offered by the publishing user. The online system 140 displays the three-dimensional reconstruction of the product on the product page. In some embodiments, the online system 140 displays the three-dimensional reconstruction of the product along with information describing the product on the product page. Information identifying other products offered by the publishing user may be displayed on the product page along with the three-dimensional reconstruction of the product, allowing another user to quickly identify various products offered for purchase by publishing user.

As another example, the online system 140 renders the three-dimensional representation of the product onto an image of a user, such as the user other than the publishing user or an additional user different from the publishing user and the other user. Subsequently, the online system 140 displays the three-dimensional reconstruction of the product rendered onto the image of the user (e.g., the additional user) to the user. If the product is an article of clothing, such a rendering allows the additional user (or the other user) to more accurately evaluate how the product would look if worn by the additional user (or by the other user). In some embodiments, the online system 140 renders the three-dimensional representation of the product onto the image of the user (or the additional user) in response to receiving a request from the user (or from the additional user). Additionally, the online system 140 may obtain the image of the user (or of the additional user) onto which the three-dimensional reconstruction of the product is rendered from the user (or the additional user); for example, the image is included in a content item obtained 310 by the online system 140 from the user (or from the additional user). The user (or the additional user) may select the content items provided to the online system 140 onto which the three-dimensional reconstruction of the product is rendered in various embodiments.

In another example, the online system 140 renders the three-dimensional reconstruction of the product along with a three-dimensional model of an additional user (or of the user) into a video that is displayed to the additional user. For example, the product is an article of clothing, and the online system 140 renders the three-dimensional reconstruction of the product onto a three-dimensional model of the user and displays the three-dimensional reconstruction of the product rendered onto the three-dimensional model of the additional user (or of the user) in a video. The video may be obtained by the online system 140 from the publishing user, or may be obtained from the additional user (or the user); for example, the video including the three-dimensional rendering of the product and the three-dimensional model of the user is included in a content item the online system 140 obtained from the user. In another embodiment, the video is included in a content item obtained from another user by the online system 140 and includes a tag identifying the user. This allows users of the online system 140 to more easily visualize the appearance of the product in a context depicted by the video.

Further, the online system 140 may use the stored three-dimensional representation of the product to allow users to perform a visual search of products maintained by the publishing user. Hence, a user provides an image of the product as a search query, and the online system 140 compares the provided image to the three-dimensional representation of the product. The online system 140 may use the trained machine-learned identification model further described above to determine a confidence of the three-dimensional representation of the product matching the image provided as the search query. In response to determining at least a threshold confidence of the three-dimensional representation of the product matching the image provided as the search query, the online system 140 displays the three-dimensional representation of the product and other information about the product previously obtained from the publishing user to the user as a search result. Hence, the three-dimensional representation of the product allows users to more readily retrieve information about the product by allowing users to more easily identify the product by allowing the online system 140 to identify the product from a search using an image of the product.

Additionally, the online system 140 may generate a virtual environment presented to users via one or more client devices configured to present virtual reality content to users. The virtual environment may include a virtual marketplace in which the three-dimensional representation of the product is displayed in a virtual reality environment to users. For example, a virtual reality environment generated by the online system 140 includes a virtual store corresponding to the publishing user in which three-dimensional representations of one or more products offered by the publishing user are presented to users, allowing the users to virtually interact with the three-dimensional representations of the products offered by the publishing user.

Figure 4:
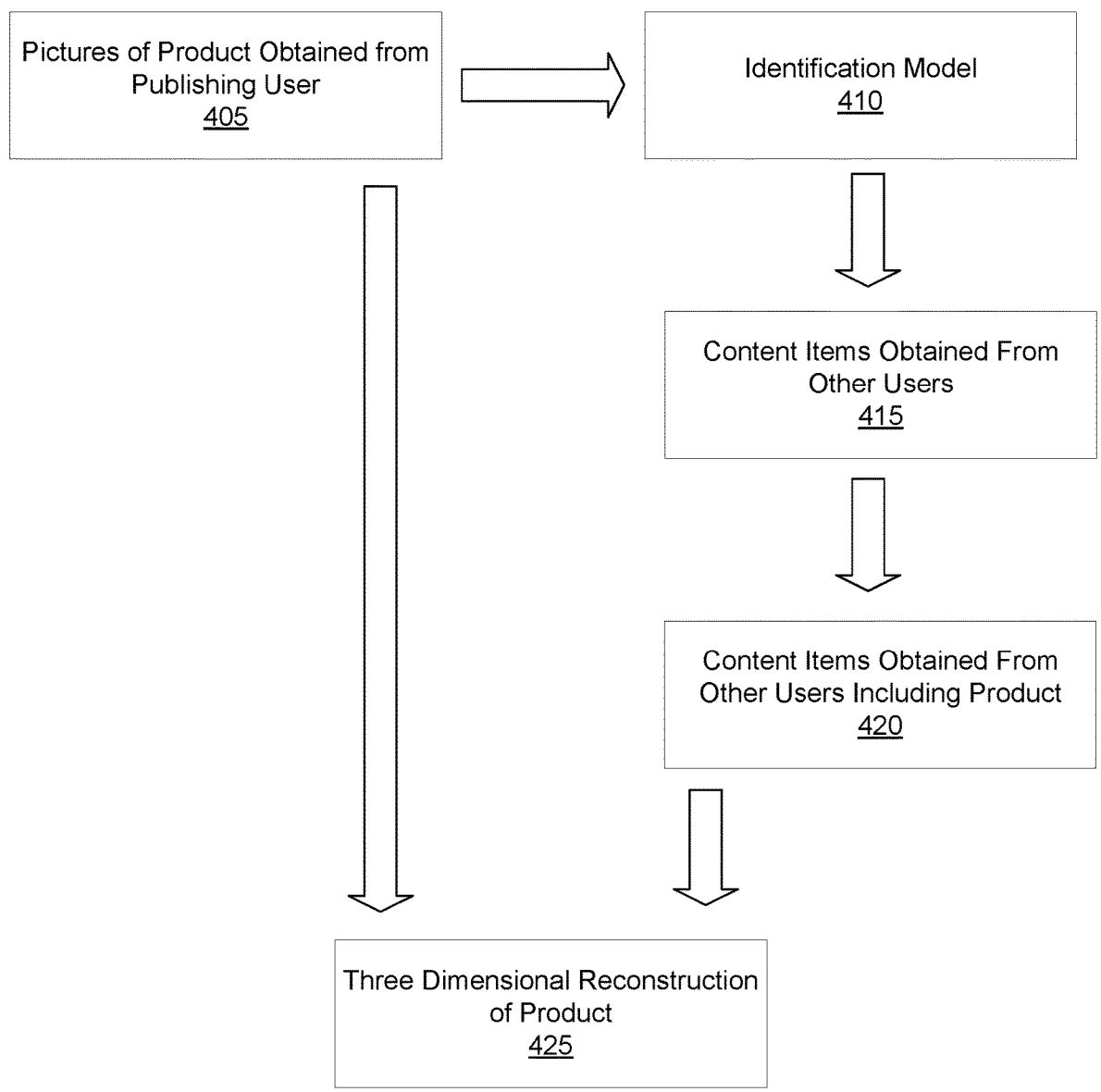
FIG. 4 is a process flow diagram for an online system generating a three-dimensional representation of a product offered by a publishing user from content items obtained from other users including the product, in accordance with an embodiment.

FIG. 4 is a process flow diagram for an online system 140 generating a three-dimensional representation of a product offered by a publishing user from content items obtained from other users including the product. The online system 140 obtains information identifying products offered by a publishing user, with information identifying a product including pictures 405 of the product captured from different angles at which the product is viewed. For example, the online system 140 obtains a product catalog from the publishing user including entries for different products offered by the publishing user, with an entry for a product including pictures 405 of the product captured from different angles viewing the product. As further described above in conjunction with FIG. 3, from the pictures 405 of the product obtained from the publishing user and from content items obtained by the online system 140 from other users including objects, the online system 140 trains an identification model 410. Based on characteristics of objects identified in a content item and characteristics of the pictures 405 of the product obtained from the publishing user, the identification model 410 determines a confidence that an object in a content item matches the product.

The online system 140 applies the identification model 410 to content items the online system 140 obtains from users other than the publishing user. This allows the online system 140 to identify content items obtained from other users, different than the publishing user, including the product. As described above in conjunction with FIG. 3, the online system 140 identifies content items 420 obtained from users other than the publishing user including an object having at least a threshold confidence of matching the product. The online system 140 applies one or more three-dimensional reconstruction models to the pictures 405 of the product obtained from the publishing user and to one or more of the content items 420 obtained from users other than the publishing user including the object having at least the threshold confidence of matching the product to generate a three-dimensional reconstruction 425 of the product. This allows the online system 140 to combine angles with which the product is viewed in one or more content items 420 obtained from users other than the publishing user including an object with at least the threshold confidence of matching the product with angles with which the product was viewed in the pictures 405 obtained from the publishing user. By identifying content items 420 obtained from users other than the publishing user including an object with at least the threshold confidence of matching the product, the online system 140 reduces a number of pictures 405 of the product to be obtained from the publishing user to generate the three-dimensional reconstruction 425 of the product.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
obtaining information identifying products offered by a publishing user of an online system, the obtained information including one or more pictures of a product corresponding to different angles of the product;
obtaining, at the online system, content items from other users of the online system different from the publishing user;
determining, by the online system, a confidence of an object identified in a content item obtained from a user different from the publishing user matching the product by applying an identification model to the object identified in the content item and to the pictures of the product obtained from the publishing user;

determining that the confidence of the object identified in the content item obtained from the user different from the publishing user equals or exceeds a threshold confidence value;

generating, by the online system, a three-dimensional reconstruction of the product by applying a three-dimensional reconstruction process to the one or more pictures of the product obtained from the publishing user and to the content item obtained from the user different from the publishing user in response to the determining;

storing, by the online system, the three-dimensional reconstruction of the product in association with the information identifying the product obtained from the publishing user;

rendering the three-dimensional representation of the product generated by the online system applying the three-dimensional reconstruction process to the one or more pictures of the product obtained from the publishing user and to the content item obtained from the user different from the publishing user onto a three-dimensional model of an additional user into a video included in a content item obtained from another user of the online system, the content item including a tag identifying the additional user, and the additional user different from the publishing user and from the user different from the publishing user from whom the content item in which the product was identified was obtained; and displaying the video to the additional user including the three-dimensional representation of the product rendered onto the three-dimensional model of the additional user.

2. The method of claim 1, further comprising:
displaying the three-dimensional reconstruction of the product in association with information identifying the product on a product page identifying one or more products offered by the publishing user.

3. The method of claim 1, further comprising:
rendering the three-dimensional reconstruction of the product onto an image of an additional user; and
displaying the three-dimensional reconstruction of the product rendered onto the image of the additional user to the additional user.

4. The method of claim 3, wherein the three-dimensional reconstruction of the product is rendered onto the image of the additional user in response to a request from the additional user.

5. The method of claim 1, further comprising:
rendering the three-dimensional reconstruction of the product onto an image of the user different from the publishing user in response to a request from the user different from the publishing user.

6. A computer program product comprising a non-transitory computer readable storage medium having instructions encoded thereon that, when executed by a processor cause the processor to:
obtain information identifying products offered by a publishing user of an online system, the obtained information including one or more pictures of a product corresponding to different angles of the product;
obtain at the online system, content items from other users of the online system different from the publishing user;

determine, by the online system, a confidence of an object identified in a content item obtained from a user different from the publishing user matching the product by applying a identification model to the object identified in the content item and to the pictures of the product obtained from the publishing user;

determine that the confidence of the object identified in the content item obtained from the user different from the publishing user equals or exceeds a threshold confidence value;

generate, by the online system, a three-dimensional reconstruction of the product by applying a three-dimensional reconstruction process to the one or more pictures of the product obtained from the publishing user and to the content item obtained from the user different from the publishing user in response to the determining;

store, by the online system, the three-dimensional reconstruction of the product in association with the information identifying the product obtained from the publishing user;

render the three-dimensional representation of the product generated by the online system applying the three-dimensional reconstruction process to the one or more pictures of the product obtained from the publishing user and to the content item obtained from the user different from the publishing user onto a three-dimensional model of an additional user into a video included in a content item obtained from another user of the online system, the content item including a tag identifying the additional user, the additional user different from the publishing user and from the user different from than the publishing user from whom the content item in which the product was identified was obtained; and display the video to the additional user including the three-dimensional representation of the product rendered onto the three-dimensional model of the additional user.

7. The computer program product of claim 6, wherein the non-transitory computer readable storage medium further has instructions encoded thereon that, when executed by the processor, cause the processor to:
display the three-dimensional reconstruction of the product in association with information identifying the product on a product page identifying one or more products offered by the publishing user.

8. The computer program product of claim 6, wherein the non-transitory computer readable storage medium further has instructions encoded thereon that, when executed by the processor, cause the processor to:
render the three-dimensional reconstruction of the product onto an image of an additional user; and
display the three-dimensional reconstruction of the product rendered onto the image of the additional user to the additional user.

9. The computer program product of claim 8, wherein the three-dimensional reconstruction of the product is rendered onto the image of the additional user in response to a request from the additional user.

10. The computer program product of claim 6, wherein the non-transitory computer readable storage medium further has instructions encoded thereon that, when executed by the processor, cause the processor to:

render the three-dimensional reconstruction of the product onto an image of the user different from the publishing user in response to a request from the user.

\* \* \* \* \*